United States Patent
Glaum et al.

(10) Patent No.: US 6,207,721 B1
(45) Date of Patent: Mar. 27, 2001

(54) ALUMINUM SILICATE SUSPENSION

(75) Inventors: Holger Glaum, Maintal-Wachenbuchen; Jürgen Schubert, Grundau, both of (DE)

(73) Assignee: Degussa-Huls Aktiengesellschaft, Hanau (DE)

(*) Notice: Subject to any disclaimer, the term of this patent is extended or adjusted under 35 U.S.C. 154(b) by 0 days.

(21) Appl. No.: 09/307,754

(22) Filed: May 10, 1999

(30) Foreign Application Priority Data

May 12, 1998 (DE) .................................. 198 21 143

(51) Int. Cl.$^7$ .............................. B01F 3/12; C01B 33/26; C04B 14/04
(52) U.S. Cl. ........................ 516/79; 106/484; 106/486; 162/181.6; 423/330.1; 516/110
(58) Field of Search ............................ 516/79, 93, 110; 106/484, 486, 287.17; 423/330.1

(56) References Cited

U.S. PATENT DOCUMENTS

| | | | |
|---|---|---|---|
| 3,130,063 | * | 4/1964 | Millman et al. .................. 106/486 X |
| 3,582,379 | * | 6/1971 | Hackbarth et al. ......... 423/330.1 X |
| 4,004,428 | * | 1/1977 | Tazawa et al. .............. 106/287.17 X |
| 4,122,031 | * | 10/1978 | Smith ..................................... 516/79 |
| 4,169,075 | | 9/1979 | Kuhling et al. . |
| 4,201,689 | * | 5/1980 | Smolka et al. ..................... 516/79 X |
| 4,280,920 | | 7/1981 | Garvey et al. ....................... 252/173 |
| 5,482,693 | * | 1/1996 | Rushmere et al. ............... 516/110 X |
| 5,648,055 | * | 7/1997 | Moffett et al. .......................... 516/79 |
| 5,766,564 | * | 6/1998 | Tijburg et al. ................ 423/330.1 X |
| 5,786,077 | | 7/1998 | McLaughlin ........................ 428/331 |

FOREIGN PATENT DOCUMENTS

| | | | |
|---|---|---|---|
| 815971 | * | 6/1969 | (CA) ................................ 423/330.1 |
| 25 27 388 | | 5/1978 | (DE) . |
| 3021295 | | 12/1981 | (DE) . |
| 2615698 | | 9/1998 | (DE) . |
| 0 046 171 A1 | | 6/1981 | (EP) . |
| 99 10 9070 | | 3/2000 | (EP) . |
| 2 628 341 A1 | | 3/1998 | (FR) . |
| 2 015 488 | | 9/1979 | (GB) . |
| 2 245 262 | | 1/1992 | (GB) . |

* cited by examiner

Primary Examiner—Richard D. Lovering
(74) Attorney, Agent, or Firm—Pillsbury Madison & Sutro

(57) ABSTRACT

An aqueous aluminium silicate suspension having a content of aluminium silicate of at least 30 wt. % is prepared by liquefaction of the aluminium silicate filter cake or by dispersion of aluminium silicate powder in water with the addition of aluminium silicate powder, surfactant and aluminium sulfate. It can be employed in papermaking.

3 Claims, 2 Drawing Sheets

Sedimentation properties at approx. 35% solids content

Sedimentation properties at approx. 40% solids content

ALUMINUM SILICATE SUSPENSION

CROSS-REFERENCE TO RELATED APPLICATION

This application claims priority from German Application No. DE 198 21 143.0, filed on May 12, 1998, the subject matter of which is hereby incorporated herein by reference.

BACKGROUND OF THE INVENTION

1. Field of the Invention

The invention relates to an aqueous aluminium silicate suspension, a process for its preparation and its use.

2. Background Information

Aluminium silicate, such as, for example, P 820 is described in Ullmanns Enzyklopädie der technischen Chemie [Ullmann's Encyclopaedia of Industrial Chemistry], 4th edition, volume 21, page 467, table 12. It is employed as a pulp filler in papermaking. The printability of newspaper and thin printing paper can be improved by using aluminium silicate. Aluminium silicate is a white powder which is marketed in this form. In papermaking, however, almost all educts are employed in the form of aqueous suspensions. Aluminium silicate therefore has the disadvantage that for its use in papermaking separate devices must be built and used for the processing, because of its pulverulent consistency. This disadvantage can be overcome if the aluminium silicate powder can be employed in papermaking in the form of an aqueous suspension.

SUMMARY OF THE INVENTION

There is therefore the object of converting pulverulent aluminium silicate into an aqueous, storage-stable suspension which has a high solids content and can be used in papermaking.

The invention provides an aqueous aluminium silicate suspension, which is characterized in that, in addition to water, it comprises at least 30 wt. %, preferably at least 35 wt. %, aluminium silicate, 0.1 to 3.0 wt. % aluminium sulfate and 0.1 to 5.0 wt. % surfactants.

In a preferred embodiment of the invention, aluminium silicate P 820 can be employed as the aluminium silicate. Surfactants which can be employed are known nonionic surfactants, such as, for example, polyethylene oxide.

Anionic and/or cationic surfactants can furthermore be employed as surfactants. Such surfactants are, for example, polyacrylates, dodecylbenzenesulfonate and sodium citrate.

In a preferred embodiment, the solids content of the suspension can be 35 to 45 wt. %, in particular 35 to 40 wt. %. The pH of the suspension can be between 4.5 and 9.5, preferably between 5.0 and 8.0.

The invention also provides a process for the preparation of the aluminium silicate suspension, which is characterized in that an aluminium silicate is precipitated by a synthetic route from aluminium sulfate and water-glass and filtered off, the aluminium silicate filter cake is liquefied by stirring and/or subjecting to shear with an aqueous aluminium sulfate solution, at least one surfactant is added, pulverulent aluminium silicate is added to the liquefied aluminium silicate filter cake, while stirring and/or subjecting to shear, and the mixture is optionally stirred and/or subjected to shear once more.

In one embodiment of the invention, the aluminium silicate filter cake can be washed and dried. The resulting aluminium silicate powder can be mixed with an aqueous aluminium sulfate solution, while stirring and/or subjecting to shear, at least one surfactant can be added, further pulverulent aluminium silicate can be added to this suspension, while stirring and/or subjecting to shear, and the mixture can optionally be stirred and/or subjected to shear once more.

The aqueous aluminium silicate suspension according to the invention advantageously has a high solids content. Sedimentation of the solid does not occur even over a relatively long storage time.

Grinding for destructuring is not necessary.

The aqueous aluminium silicate suspension according to the invention can be employed in papermaking.

DETAILED DESCRIPTION OF THE INVENTION

EXAMPLES

The starting materials are characterized in table 1:

TABLE 1

Physico-chemical data of P 820A powder and filter cake

|  | P 820A powder | P 820 A filter cake |
|---|---|---|
| Tamped density [g/l] | 237 | — |
| Loss on drying [%] | 6.4 | 70.0 |
| Solids content [%] | 93.6 | 30 |
| Average particle size [$\mu$m] | 5.6 | 7.5 |
| Surface area [m$^2$/g] | 66 | — |
| DBP adsorption [g/100 g] | 90 | — |
| pH | 9.5 | 8.9 (slurry) |

Preparation of the Slurry 2400 g aluminium silicate P 820A paste are gradually added to a 5 l measuring beaker and subjected to shear with a Dispermat at 8500 rpm. At the same time, 30 ml Al$_2$(SO$_4$)$_3$ solution with a concentration of 90 g/l are added in stages. The shear time of the liquefaction is 14 min. The influence of the added aluminium sulfate and of the shearing can be seen from tables 2 and 3.

TABLE 2

| Aluminium sulfate | | | Viscosity |
|---|---|---|---|
| [ml solution] | [g/100 g slurry] | pH | [mPa*s] |
| 0 | 0 | 8.9 | 2000 |
| 0.5 | 0.02 | 8.9 | 2000 |
| 2 | 0.09 | 8.2 | 1800 |
| 4 | 0.18 | 6.8 | 1600 |
| 6 | 0.27 | 6.1 | 1500 |
| 8 | 0.36 | 5.7 | 1430 |
| 10 | 0.45 | 5.3 | 1400 |
| 12 | 0.54 | 5.1 | 1500 |
| 14 | 0.63 | 4.9 | 1900 |
| 16 | 0.72 | 4.8 | 1650 |
| 18 | 0.81 | 4.6 | 1650 |
| 20 | 0.90 | 4.5 | 1450 |
| 25 | 1.13 | 4.4 | 1200 |

TABLE 3

| Shear time [min] | Viscosity [mPa*s] | Average particle size $d_{50}$ [μm] |
|---|---|---|
| 0 | 2600 | 7.7 |
| 5 | 100 | 7.1 |
| 10 | 80 | 7.1 |
| 15 | 65 | 7.1 |
| 20 | 55 | 7.1 |

The surfactant additive is stirred in at a low speed of rotation. The suspension is then subjected to dispersion for one minute at 8500 rpm. The amount added is shown in tables 5 to 7.

The desired solids content is now established with P 820A powder.

35% SC: addition of 217.1 g powder

40% SC: addition of 456.3 g powder

The time for the concentration is 15 min. The suspension obtained in this way is subjected to dispersion at 8500 rpm for a further 30 min.

Finally, the slurry is subjected to shear once again for 15 min with an Ultra-Turrax, while simultaneously stirring with an IKA laboratory stirrer (dispersing disc φ=6 cm, 1000 rpm).

The sedimentation, pH, viscosity, grindometer value and time for redispersion by vibration and rotation are determined on the aluminium silicate (P 820 A) suspensions, which keep at room temperature. After one day, the actual solids content is additionally determined. These values are determined 1 d, 4 weeks and 14 weeks after preparation of the suspension.

DESCRIPTION OF THE METHODS USED

Sedimentation

The individual layers of the suspension are measured on a centimeter scale. A distinction can be made between the following three types:
1. Supernatant water
2. Suspension
3. Sediment Liquefaction by Vibration The sample bottles are clamped upside down in the vibrating screen (Retsch, AS 200 digit) and vibrated at intervals with an amplitude of 100. The time taken for the suspension to redisperse completely is determined. If no redispersion is to be achieved, the experiment is interrupted after 10 min.

Liquefaction by Rotation

The samples are rotated on a roller mixer (setting 1) until a homogeneous suspension has formed again. Here also, the maximum treatment time is 10 min.

Measurement of the pH

The liquefied suspension is mixed thoroughly on a magnetic stirrer for 5 min. After the stirrer has been switched off, the pH is read.

Measurement of the Viscosity

Immediately after the pH has been determined, the viscosity is measured with a Brookfield DV-II+viscometer (spindle no. 62, 100 RPM). Here also, the value is read after 5 min.

Grindometer

After thorough mixing of the suspension, the particle size of the suspension is determined with a grindometer.

Solids Content 100 g of the redispersed suspension are dried to constant weight in a drying cabinet at 105° C.

If liquefaction of the suspension cannot be effected by vibration or rotation, an attempt is made to liquefy the suspension with a spatula.

The pH, viscosity, grindometer value and solids content are determined only on a completely redispersed suspension.

The data determined by the test methods described are listed in tables 6–8. To evaluate the suitability of an additive for improving the properties of the suspension, three factors are to be considered more closely: The ease of incorporation of the additive, the sedimentation properties of the suspension and the redispersibility of the sediment.

Sedimentation Properties

Redispersiblity

Figure 1:
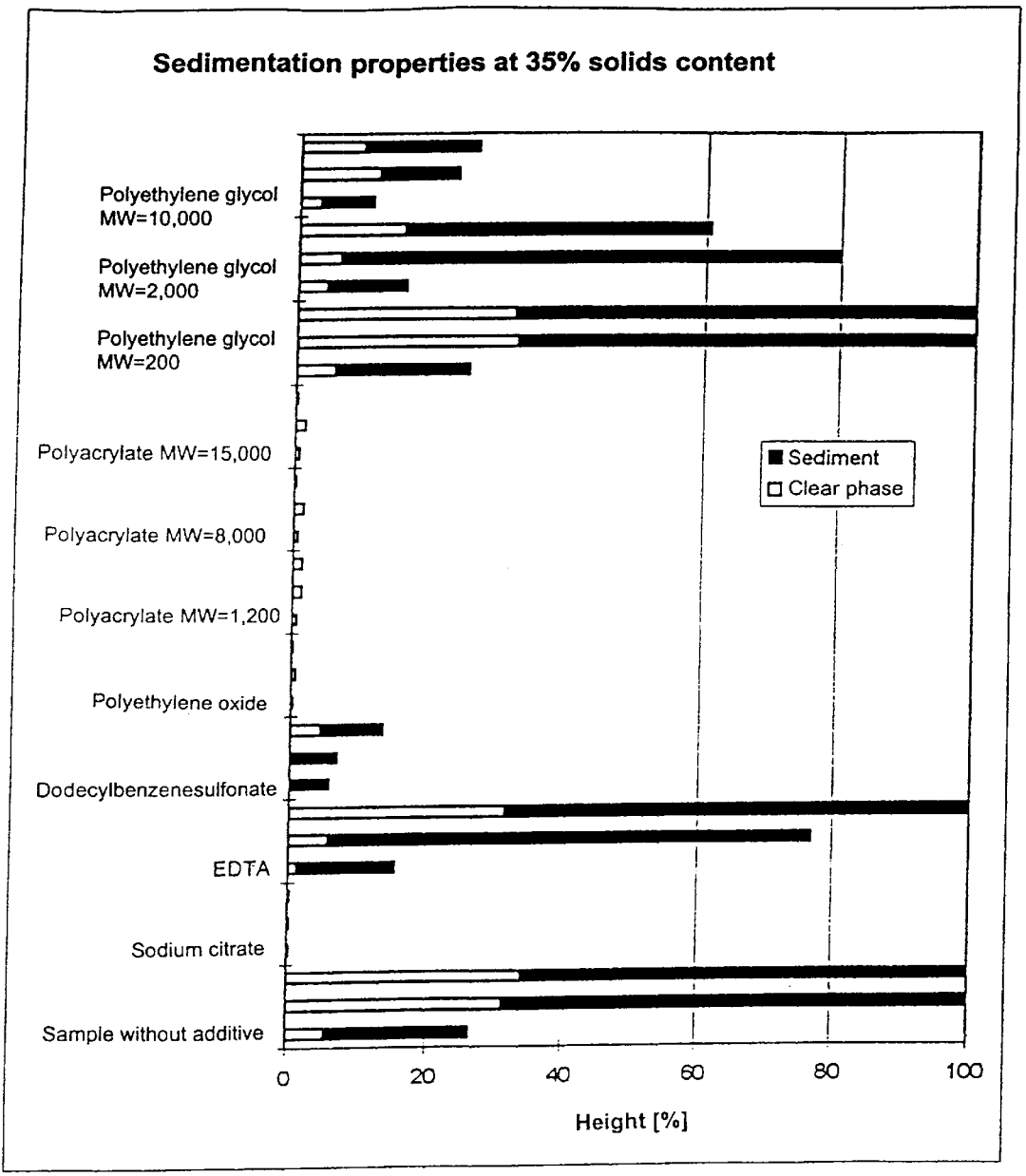
FIGS. 1 and 2 show the sedimentation properties of suspensions to which various stabilizers have been added, for solids contents of approx. 35 wt. % and 40 wt. % respectively. The heights of the sediment and water phase are shown in these figures. For each additive (demarcated by the small transverse line on the left-hand edge of the graph) the values for storage after 1 d (bottom bar), after 4 weeks (middle bar) and 14 weeks (top bar) are plotted. A good storage stability exists if no solid sediment forms and if no clear aqueous phase forms above the suspension, that is to say always if the sum of the sedimentation height and the height of the aqueous phase tends towards zero. This is the case for all the polyacrylates investigated and for polyethylene oxide at a solids content of both 35% and 40%. It was possible to investigate sodium citrate and dodecylbenzenesulfonate only at a solids content of 35%, and a very low tendency towards sedimentation is likewise found.
Figure 2:
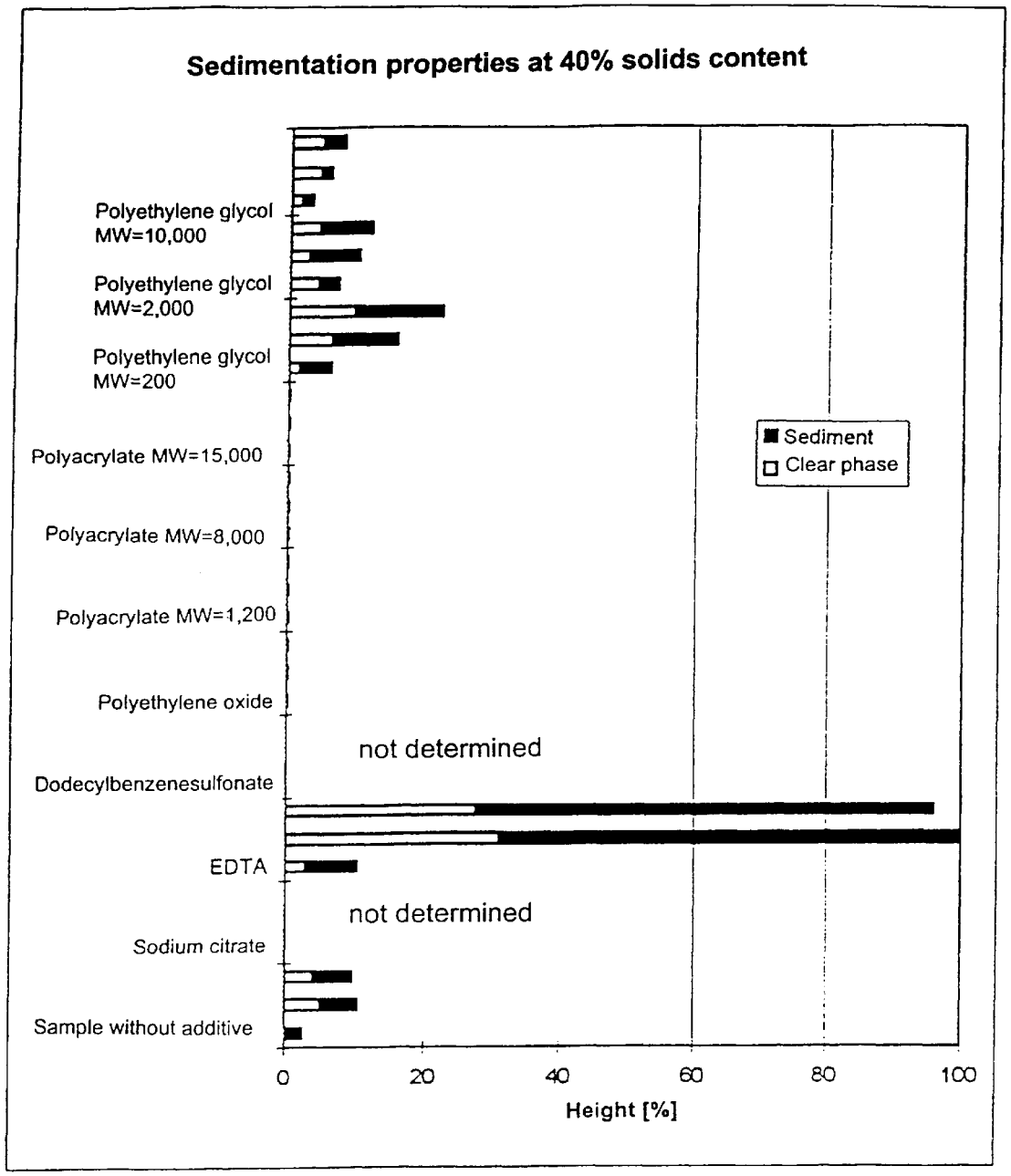

Although the suspensions are liquid after the preparation, they become paste-like on cooling. This cannot be prevented even by addition of the additives investigated. However, the suspensions differ very widely in the energy expenditure with which liquefaction can take place. An attempt is made to determine this introduction of energy needed by defined vibration or rotation of the sample glass. For some samples, liquefaction can be achieved in this way. However, there are also suspensions which cannot be liquefied merely by vibration and rotation, but liquefy immediately after the surface of the suspension is penetrated with a spatula. To evaluate the redispersibility, all the observations are therefore combined and assigned subjectively to a scale from very good to very poor. The results are listed in table 4.

Ease of Incorporation

Ease of incorporation is to be understood as meaning how the incorporation of the powder for concentration of the slurry took place after addition of the stabilizer. This parameter cannot be determined by measurement, and the subjective evaluation of the person performing the test has therefore been used for this.

TABLE 4

Evaluation of the various stabilizers

| Stabilizer | Ease of incorporation | Sedimentation properties | Redispersibility |
|---|---|---|---|
| Polyethylene oxide | + | ++ | + |
| Polyacrylate (MW = 1,200) | + | + | + |
| Polyacrylate (MW = 8,000) | + | + | + |
| Polyacrylate (MW = 15,000) | + | + | + |
| Sodium citrate | – | + | + |
| EDTA | ++ | – | –– |
| Polyethylene glycol (MW = 200) | ++ | – | –– |
| Polyethylene glycol (MW = 2,000) | + | – | – |

TABLE 4-continued

Evaluation of the various stabilizers

| Stabilizer | Ease of incorporation | Sedimentation properties | Redispersibility |
|---|---|---|---|
| Polyethylene glycol (MW = 10,000) | + | – | o |
| Dodecylbenzenesulfonate | – – | o | – – |

++ very good
+ good
o adequate
– poor
– – very poor

TABLE 5

Investigation of the storage stability of aqueous P 820A suspensions with various additives and solids contents

| | Example | | | | | | |
|---|---|---|---|---|---|---|---|
| | 1 | 2 | 3 | 4 | 5 | 6 | 7 |
| Additive | Sample without additive | | Polyacrylate ($M_w$ = 1,200) | | Polyethylene glycol ($M_w$ = 200) | | Sodium citrate |
| Concentration | — | — | 2.0% (39.6 ml) | 2.0% (43.3 ml) | 1.0% (23.3 ml) | 1.0% (25.4 ml) | 2.0% (52.3 g) |
| Storage: | | | | | | | |
| 1 d | | | | | | | |
| Analysis: | | | | | | | |
| clear layer [%] | 5.6 (cloudy) | — | 0.7 (clear) | — | 5.6 (cloudy) | 1.6 (cloudy) | — |
| Slurry [%] | 73.6 (liquid) | 97.3 (pasty) | 99.3 (pasty)[1] | 100 (pasty)[1] | 75.0 (liquid) | 93.8 (liquid) | 100 (pasty) |
| Sediment [%] | 20.8 (solid)[3] | 2.7 (solid)[3] | — | — | 19.4 (solid)[3] | 4.7 (solid)[3] | — |
| Liq. by vibration [min · s] | n. redisp. | 2.44 | n. redisp. | 5.33 | n. redisp. | 4.41 | 1.22 |
| Liq. by rotation [min · s] | 8.30 | 2.30 | 1.30 | 10.00 | 7.00 | 3.30 | 6.45 |
| pH | 7.7 | 8.0 | 7.8 | 7.8 | 7.9 | 7.9 | 8.0 |
| Visc. [mPasxs] | 39 | 79 | 42 | 104 | 40 | 53 | 49 |
| Grind. [um] | >100 | 80 | 70 | 80 | 65 | 70 | 65 |
| SC [%] | 35.3 | 42.4 | 35.9 | 41.7 | 36.1 | 41.4 | 36.5 |
| 4 w | | | | | | | |
| clear layer [%] | 31.4 (cloudy) | 5.3 (clear) | 1.4 (clear) | — | 32.4 (cloudy) | 6.3 (cloudy) | — |
| Slurry [%] | — | 89.3 (pasty) | 98.6 (pasty)[1] | 100 (pasty)[1] | — | 84.4 (pasty) | 100 (pasty)[1] |
| Sediment [%] | 68.6 (solid) | 5.3 (solid)[3] | — | — | 67.6 (solid) | 9.4 (solid) | — |
| Liq. by vibration [min · s] | n. redisp. | n. redisp. | n. redisp.[4] | n. redisp.[4] | n. redisp. | n. redisp. | n. redisp.[4] |
| Liq. by rotation [min · s] | n. redisp. | n. redisp. | n. redisp. | n. redisp. | n. redisp. | n. redisp. | n. redisp. |
| pH | — | 8.1 | 7.9 | 8.0 | — | — | 8.1 |
| Visc. [mPasxs] | — | 75 | 65 | 122 | — | — | 43 |
| Grind. [um] | — | 75 | 70 | 80 | — | — | 80 |
| 14 w | | | | | | | |
| clear layer [%] | 34.2 (cloudy) | 4.2 (cloudy) | 1.4 (clear) | — | 32 (cloudy) | 9.5 (cloudy) | — |
| Slurry [%] | — | 90.3 (pasty) | 98.6 (pasty)[1] | 100 (pasty)[2] | — | 77.8 (pasty) | 100 (pasty)[2] |
| Sediment [%] | 65.8 (solid) | 5.6 (solid)[3] | — | — | 68.0 (solid) | 12.7 (solid) | — |
| Liq. by vibration [min · s] | n. redisp. | n. redisp. | n. redisp.[4] | n. redisp.[4] | n. redisp. | n. redisp. | n. redisp.[4] |
| Liq. by rotation [min · s) | n. redisp. | n. redisp. | n. redisp. | n. redisp. | n. redisp. | n. redisp. | n. redisp. |
| pH | — | 8.1 | 7.9 | 8.0 | — | — | 8.0 |
| Visc. [mPasxs] | — | 160 | 65 | 134 | — | — | 62 |
| Grind. [um] | — | 80 | 70 | 80 | — | — | 70 |

TABLE 6

Investigation of the storage stability of P 820A slurries with various additives and solids contents

| | Example | | | | | | |
|---|---|---|---|---|---|---|---|
| | 8 | 9 | 10 | 11 | 12 | 13 | 14 |
| Additive | EDTA | | Dodecylbenzene-sulfonate | | Polyethylene oxide | | Polyacrylate ($M_w$ = 8,000) |
| Concentration | 3.0% (78.5 g) | 3.0% (85.7 g) | 0.5% (13.1 g) | | 1.5% (39.3 g) | 1.5% (42.8 g) | 2.0% (40.2 ml) | 2.0% (43.9 ml) |

TABLE 6-continued

Investigation of the storage stability of P 820A slurries with various additives and solids contents

| | Example | | | | | | |
|---|---|---|---|---|---|---|---|
| | 8 | 9 | 10 | 11 | 12 | 13 | 14 |

Storage:

1 d

Analysis:

| | | | | | | | |
|---|---|---|---|---|---|---|---|
| clear layer [%] | 1.3 (cloudy) | 3.0 (cloudy) | — | — | — | 0.7 (clear) | — |
| Slurry [%] | 84.8 (liquid) | 89.6 (liquid) | 94.3 (liquid) | 100 (paste-liq.) | 100 (pasty) | 99.3 (pasty) | 100 (pasty)[1] |
| Sediment [%] | 13.9 (solid)[3] | 7.5 (solid)[3] | 5.7 (pasty) | — | — | — | — |
| Liq. by vibration [min · s] | n. redisp. | n. redisp. | 0.21 | immediately without vibr. | 1.34 | 2.20 | n. redisp.[4] |
| Liq. by rotation [min · s] | 7.30 | 7.00 | 2.00 | immediately without rot. | 0.07 | 1.45 | n. redisp. |
| pH | 4.3 | 4.3 | 7.5 | 7.8 | 7.8 | 7.7 | 7.7 |
| Visc. [mPasxs] | 37 | 53 | 36 | 206 | 681 | 83 | 166 |
| Grind. [um] | 70 | 70 | 55[6] | 70 | 65 | 70 | 75 |
| SC [%] | 36.2 | 42.1 | 35.4 | 36.6 | 42.4 | 36.6 | 42.5 |

4 w

| | | | | | | | |
|---|---|---|---|---|---|---|---|
| clear layer [%] | 5.7 (cloudy) | 31.1 (cloudy) | — | 0.7 (clear) | — | 1.5 (clear) | — |
| Slurry [%] | 22.9 (liquid) | — | 93.2 (pasty) | 99.3 (pasty) | 100 (pasty)[1] | 98.5 (pasty)[1] | 100 (pasty)[1] |
| Sediment [%] | 71.4 (solid) | 68.9 (solid) | 6.8 (solid) | — | — | — | — |
| Liq. by vibration [min · s] | n. redisp. | n. redisp. | n. redisp. | 7.34 | n. redisp.[5] | n. redisp.[4] | n. redisp.[4] |
| Liq. by rotation [min · s] | n. redisp. | n. redisp. | n. redisp. | 2.30 | n. redisp. | n. redisp. | n. redisp. |
| pH | — | — | — | 7.9 | 7.9 | 7.8 | 7.8 |
| Visc. [mPasxs] | — | — | — | 240 | 568 | 77 | 149 |
| Grind. [um] | — | — | — | 70 | 60 | 65 — | 70 |

14 w

| | | | | | | | |
|---|---|---|---|---|---|---|---|
| clear layer [%] | 31.5 (cloudy) | 27.5 (cloudy) | 4.4 (cloudy) | — | — | — | — |
| Slurry [%] | — | — | 86.8 (pasty) | 100 (pasty)[1] | 100 (pasty)[1] | 100 (pasty)[1] | 100 (pasty)[1] |
| Sediment [%] | 68.5 (solid) | 68.5 (solid) | 8.8 (solid) | — | — | — | — |
| Liq. by vibration [min · s] | n. redisp. | n. redisp. | n. redisp. | n. redisp.[4] | n. redisp.[5] | n. redisp.[5] | n. redisp.[2] |
| Liq. by rotation [min · s] | n. redisp. | n. redisp. | n. redisp. | n. redisp. | n. redisp. | n. redisp. | n. redisp. |
| pH | — | — | — | 7.8 | 7.8 | 7.8 | 7.8 |
| Visc. [mPasxs] | — | — | — | 286 | 710 | 90 | 194 |
| Grind. [um] | — | — | — | 70 | 70 | 70 | 70 |

[1]easy to redisperse by stirring with a spatula
[2]can be redispersed with a spatula with some effort
[3]difficult to redisperse by stirring with a spatula
[4]redisperses immediately after penetration
[5]redisperses after max. 1 min after penetration
[6]grind. determ. difficult, since suspension foamed

TABLE 7

Investigation of the storage stability of Pasilex A slurries with various additives and solids contents

| | Example | | | | | |
|---|---|---|---|---|---|---|
| | 15 | 16 | 17 | 18 | 19 | 20 |
| Additive Concentration | Polyacrylate $M_w$ = 15,000 | | Polyethylene glycol ($M_w$ = 2,000) | | Polyethylene glycol ($M_w$ = 10,000) | |
| | 2.0% (41.8 ml) | 2.0% (45.7 ml) | 2.0% (52.3 g) | 2.0% (57.1 g) | 3.0% (78.5 g) | 3.0% (85.7 g) |

Storage:

1 d

Analysis:

| | | | | | | |
|---|---|---|---|---|---|---|
| clear layer [%] | 0.7 (clear) | — | 4.2 (cloudy) | 4.3 (cloudy) | 3.0 (cloudy) | 1.6 (cloudy) |
| Slurry [%] | 99.3 (pasty) | 100 (pasty) | 84.5 (liquid) | 92.9 (paste-liq.) | 89.6 (liquid) | 96.8 (liquid) |
| Sediment [%] | — | — | 11.3 (solid) | 2.9 (solid) | 7.5 (solid) | 1.6 (solid) |
| Liq. by vibration [min · s] | 0.55 | 1.34 | n. redisp. | 4.00 | 0.51 | 1.20 |
| Liq. by rotation [min · s] | 0.45 | 8.15 | 6.00 | 3.15 | 2.00 | 0.30 |
| pH | 7.8 | 7.9 | 7.6 | 7.7 | 7.8 | 7.9 |
| Visc. [mPasxs] | 46 | 177 | 42 | 66 | 84 | 126 |
| Grind. [um] | 65 | 65 | 70 | 70 | 70 | 65 |
| SC [%] | 36.1 | 41.6 | 36.6 | 41.7 | 36.9 | 42.1 |

TABLE 7-continued

Investigation of the storage stability of Pasilex A slurries with various additives and solids contents

|  | Example | | | | | |
|---|---|---|---|---|---|---|
|  | 15 | 16 | 17 | 18 | 19 | 20 |
| 4 w | | | | | | |
| clear layer [%] | 1.5 (clear) | — | 6.2 (cloudy) | 2.9 (cloudy) | 11.4 (cloudy) | 4.4 (cloudy) |
| Slurry [%] | 98.5 (pasty)[1] | 100 (pasty)[1] | 20.0 (liquid) | 89.9 (pasty) | 77.1 (pasty) | 94.1 (pasty) |
| Sediment [%] | — | — | 73.8 (solid) | 7.2 (solid)[3] | 11.4 (solid)[2] | 1.5 (solid)[1] |
| Liq. by vibration [min · s] | n. redisp.[4] | n. redisp.[4] | n. redisp. | n. redisp. | n. redisp. | n. redisp. |
| Liq. by rotation [min · s] | n. redisp. | n. redisp. | n. redisp. | n. redisp. | 7.30 | n. redisp. |
| pH | 8.0 | 8.0 | — | 7.8 | 7.9 | 7.9 |
| Visc. [mPasxs] | 75 | 181 | — | 174 | 131 | 235 |
| Grind. [um] | 80 | 85 | — | 70 | 70 | 70 |
| 14 w | | | | | | |
| clear layer [%] | — | — | 15.2 (cloudy) | 4.4 (cloudy) | 9.1 (cloudy) | 4.7 (cloudy) |
| Slurry [%] | 100 (pasty)[1] | 100 (pasty)[2] | 39.4 (pasty) | 88.2 (pasty) | 74.2 (pasty) | 92.2 (pasty) |
| Sediment [%] | — | — | 45.5 (solid) | 7.4 (solid)[3] | 16.7 (solid) | 3.1 (solid) |
| Liq. by vibration [min · s] | n. redisp.[5] | n. redisp.[5] | n. redisp. | n. redisp. | n. redisp. | n. redisp. |
| Liq. by rotation [min · s] | n. redisp. | n. redisp. | n. redisp. | n. redisp. | n. redisp. | n. redisp. |
| pH | 8.0 | 7.9 | — | 7.8 | — | — |
| Visc. [mPasxs] | 120 | 254 | — | 268 | — | — |
| Grind. [um] | 80 | 80 | — | 70 | — | — |

[1] easy to redisperse by stirring with a spatula
[2] can be redispersed with a spatula with some effort
[3] difficult to redisperse by stirring with a spatula
[4] redisperses immediately after penetration
[5] redisperses after max. 1 min after penetration
[6] grind. determ. difficult, since suspension foamed

What is claimed is:

1. Aqueous aluminum silicate suspension, which comprises, in addition to water, at least 30 wt. % aluminum silicate, 0.1 to 3.0 wt. % aluminum sulfate and 0.1 to 5.0 wt. % surfactant.

2. A process for the preparation of an aqueous aluminum silicate suspension comprising at least 30 wt. % aluminum silicate, 0.1 to 3.0 wt. % aluminum sulfate and 0.1 to 5.0 wt. % surfactant, said process comprising the following steps:

(i) an aluminum silicate is precipitated by a synthetic route from aluminum sulfate and water-glass and filtered off;

(ii) the aluminum silicate filter cake is liquefied by stirring and/or subjecting to shear with an aqueous aluminum sulfate solution and at least one surfactant is added; (iii)

(iii) pulverulent aluminum silicate is added to the liquefied aluminum silicate filter cake, while stirring and/or subjecting to shear; and (iv) the mixture is optionally stirred and/or subjected to shear once more.

3. The process according to claim 2, wherein the aluminum silicate filter cake is washed and dried, the resulting aluminum silicate powder is mixed with an aqueous aluminum sulfate solution, while stirring and/or being subjected to shear, at least one surfactant is added, further aluminum silicate powder is added to this suspension, while stirring and/or subjecting to shear, and the mixture is optionally stirred and/or subjected to shear once more.

* * * * *